United States Patent

Pieuchard et al.

3,909,134

Sept. 30, 1975

[54] MONOCHROMATOR WITH A CONCAVE GRATING

[75] Inventors: Guy Pieuchard, Fontenay-Le-Fleury; Jean Flamand, Chatenay Malabry; Jean Cordelle, Marly-Le-Roi, all of France

[73] Assignee: Jobin-Yvon, Longjumeau, France

[22] Filed: July 19, 1974

[21] Appl. No.: 489,855

[30] Foreign Application Priority Data

Aug. 6, 1973   France .............................. 73.28625

[52] U.S. Cl. ................ 356/99; 350/162 R; 356/100
[51] Int. Cl.$^2$ ........................................... G01J 3/18
[58] Field of Search ...................... 356/79, 99, 100; 350/162 R

[56] References Cited
UNITED STATES PATENTS
3,628,849   12/1971   Flamand et al. ................ 350/162 R OTHER PUBLICATIONS
"Aberration–Corrected Concave Gratings Made Holographically," by Cordelle et al., published in the work *Optical Instruments and Techniques,* 1969, (Oriel Press, London), pp. 117–124.

*Primary Examiner*—Ronald L. Wibert
*Assistant Examiner*—F. L. Evans
*Attorney, Agent, or Firm*—Alan H. Levine

[57] ABSTRACT

Monochromator having a concave grating of the type in which monochromatic selection is carried out solely by rotation of the grating about its apex, comprising a grating, a fixed entry slit to light up the grating with a beam of white light and a fixed exit slit to collect monochromatic light reflected from the grating, the said grating having the form of a concave spherical calotte and the lines of the grating being situated at the intersection of the calotte with a family of quadrics of revolution one of the foci of which is situated at the centre of curvature of the spherical calotte wherein the two slits of the monochromator are each situated at a distance from the apex of the spherical calotte of between R and 0.84 R where R is the radius of the spherical calotte, and the angle at which the two slits are viewed from the apex of the spherical calotte is between 26° and 65°.

7 Claims, 3 Drawing Figures

MONOCHROMATOR WITH A CONCAVE GRATING

FIELD OF THE INVENTION

The present invention relates to a monochromator having a concave grating of the type in which monochromatic selection is carried out solely by rotation of the grating about its apex.

It is known that the parameters of such a monochromator are the nature of the grating, the positions of the entry slit by which the grating is illuminated with white light and of the exit slit through which the wavelength which has been selected by rotation of the grating is emitted.

BACKGROUND OF THE INVENTION

One type of monochromator has already been described in which the grating is supported on a surface in the form of a spherical calotte, one of the slits is arranged at a distance from the apex of the grating of between 0.8 and 1.2 R where R is the radius of the spherical calotte, and the two slits are viewed from the apex of the grating at an angle of between 20° and 80°.

The grating of these monochromators is obtained by a holographic process which consists of bringing about the interference of two beams from two coherent point sources, the positions of the lines of the grating being determined by the intersection of the interference fringes with a concave receptor surface in the form of a spherical calotte.

Such a process has been described, for example, in the following articles:

"Les Reseaux Holographiques" by Jean CORDELLE, published in the review "Atomes/Instruments de Mesure" (volume 24, pages 763 to 765);

"Spectographic performance of holographically made diffraction gratings" by Antoine LABEYRIE and Jean FLAMAND, published in the review "Optics Communications" (Volume, 1, No. 1, April 1969, pages 5 to 8) and "Aberration-Corrected Concave Gratins made Holographically" by Jean CORDELLE, Jean FLAMAND and Guy PIEUCHARD, published in the work "Optical Instruments and Techniques 1969" (Oriel Press, London).

U.S. Pat. No. 3,628,849 also describes such gratings.

The process consists of causing two coherent light waves emitted from two points and originating from a laser to fall on a layer under such conditions that the surface of interference of the two waves intersect the layer, the light energy concentrated on these surfaces producing sufficient modification of the layer at the zone of intersection.

This layer may be, for example, a layer of photopolymerisable resin deposited on the optically polished surface of a support made of a suitable material and having a suitable form, for example a support of glass or silica, the sensitive surface of which is concave and may have, for example, the form of a spherical calotte A solvent is then applied to selectively dissolve either the resin which has been polymerised by the light energy or the resin which has not been polymerised, so that the lines of the grating appear.

If it is desired to obtain a grating by reflection, the surface of the grating is subsequently metallised under vacuum.

SUMMARY OF THE INVENTION

The object of the present invention is to provide monochromators which are particularly useful on account of their improved properties of resolution and luminosity.

More precisely, the present invention seeks to provide monochromators which are distinguished by the fact that they can be used within a spectral range as extended as 1000–8000 A. with a relative defocalisation of not more then 0.04% and consequently have the advantageous resolution associated with such a very low defocalisation.

This is achieved according to the present invention by the fact that the two slits of the monochromator are each situated at a distance from the apex of the grating of between R and 0.84 R and by the fact that the angle at which these two slits are viewed from the apex of the grating is between 26° and 65°.

The grating itself is formed in known manner as a spherical calotte and the lines of the grating are situated in known manner at the intersection of the spherical calotte with a family of quadrics of revolution one of the foci of which is situated at the centre of curvature of the calotte the other being situated preferably on that slit which is closer to the apex of the grating.

The term "quadrics of revolution" is used to denote ellipsoids, hyperboloids and paraboloids with the exclusion of degenerated quadrics which are planes.

In a particularly preferred embodiment of the present invention, one of the slits is at a distance R from the apex of the grating and the other at a distance of between 0.92 R and 0.84 R, and the two slits are viewed at an angle within the range of 45° to 52°.

Another advantageous embodiment is one in which the two slits are situated each at a distance from the apex of the spherical calotte of between 0.90 and 0.84 R and are viewed from the apex at an angle of between 60 and 65°.

The number of lines on the grating are preferably between 900 and 1650 per millimeter, more preferably between 1200 and 1600 per millimeter.

DETAILED DESCRIPTION OF THE INVENTION

In the Figures,

H is a concave grating having N lines per mm;
V is the apex of grating;
R is the radius of curvature of the grating;
E is the entry slit;
S is the exit slit;
$a$ is the angle at which the two slits are viewed from the apex V;
$d_1$ is the distance of the entry slit from the apex V;
$d_2$ is the distance of the exit slit from the apex V;

The individual characteristics of the three monochromators and the results obtained are indicated in the following table.

Figure 1:
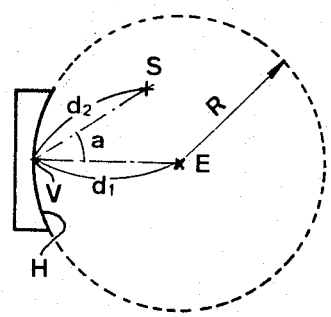
FIG. 1 is a schematic illustration of a monochromator according to the invention.
Figure 2:
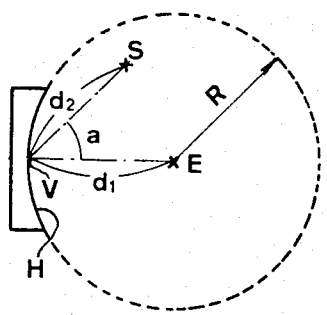
FIG. 2 is a schematic illustration of an alternative monochromator according to the invention.
Figure 3:
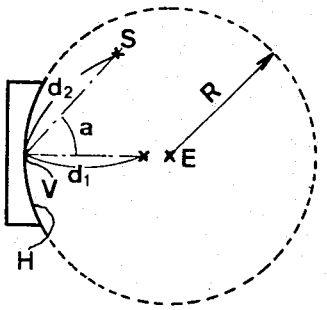
FIG. 3 is a schematic illustration of another alternative monochromator according to the invention.

| | N | a(°) | $d_1/R$ | $d_2/R$ | $\frac{\Delta d_1}{d_1}$ or $\frac{\Delta d_2}{d_2}$ | utilisation range |
|---|---|---|---|---|---|---|
| Example 1 (Figure 1) | 1484 | 46 | 1 | 0.90 | 0–0.02 | 2000 – 8000 A |
| Example 2 (Figure 2) | 1600 | 51 | 1 | 0.85 | 0–0.002 | 2000 – 6000 A |
| Example 3 (Figure 3) | 1200 | 62 | 0.90 | 0.84 | 0–0.04 | 2000 – 8000 A |

($\Delta d_1/d_1$) and ($\Delta d_2/d_2$) are the relative defocalisations of the monochromators.

We claim:

1. A monochromator in which monochromatic selection is carried out solely by rotation of the grating about its apex, comprising a grating in the form of a concave spherical calotte, the lines of which are situated at the intersection of said calotte with a family of quadrics of revolution, one of the foci of which is situated at the centre of curvature of said spherical calotte;

means defining an entry slit for illuminating said grating with a beam of white light; and means defining an exit slit for collecting monochromatic light reflected from said grating, wherein said two slits are each situated at a distance from the apex of the spherical calotte of between R and 0.84 R where R is the radius of said spherical calotte, and the angle at which said two slits are viewed from said apex of said spherical segment is between 26° and 65°.

2. Monochromator according to claim 1, wherein said grating has 900 to 1650 lines to the millimeter.

3. Monochromator according to claim 2, wherein one of said slits is situated at a distance R from said apex of said spherical calotte and that the other of said slits is situated at a distance of between 0.92 R and 0.84 R, said two slits being viewed from said apex at an angle within the range of 45° to 52°.

4. Monochromator according to claim 1, wherein said grating has 1484 lines to the millimeter, the distances of said two slits from said apex of said spherical calotte are equal to R and 0.90 R, respectively, and said angle at which said two slits are viewed from said apex of said spherical calotte is 46°.

5. Monochromator according to claim 1, wherein said grating has 1600 lines per millimeter, the distances of said two slits to said apex of said spherical calotte are R and 0.85 R, respectively, and said angle at which said two slits are viewed from said apex of said spherical calotte is 51°.

6. Monochromator according to claim 1, wherein said two slits are situated each at a distance from said apex of said spherical calotte of between 0.90 and 0.84 R and are viewed from said apex at an angle of between 60° and 65°.

7. Monochromator according to claim 1, wherein said grating has 1200 lines to the millimeter, the distances of said two slits from said apex of said spherical calotte are 0.90 R and 0.84 R, respectively, and said angle at which said two slits are viewed from said apex of said spherical calotte is 62°.

* * * * *